United States Patent [19]

Booher

[11] 4,071,153

[45] Jan. 31, 1978

[54] VERTICAL PUSHER PLATE FOR A HORIZONTALLY DISCHARGING SEMI-TRAILER

[75] Inventor: Howard Booher, Randolph, Ohio

[73] Assignees: Robert J. Bruce, New Castle, Pa.; Mark T. Tate, Atwater, Ohio

[21] Appl. No.: 716,988

[22] Filed: Aug. 23, 1976

[51] Int. Cl.² .............................................. B65F 3/20
[52] U.S. Cl. ................................................. 214/82
[58] Field of Search ................ 214/82, 83.3, 510, 514, 214/83.22, 83.28; 296/28 M, 28 R, 28 D; 280/106

[56] References Cited

U.S. PATENT DOCUMENTS

| 2,258,988 | 10/1941 | Le Laurin | 214/82 |
| 3,273,728 | 9/1966 | Kelso | 214/82 |
| 3,572,251 | 3/1971 | Johnson | 104/89 |
| 3,901,394 | 8/1975 | Bowles | 214/82 |
| 3,913,494 | 10/1975 | Coleson et al. | 104/89 |
| 3,953,170 | 4/1976 | Webb | 214/82 |

Primary Examiner—Johnny D. Cherry
Assistant Examiner—Lawrence E. Williams
Attorney, Agent, or Firm—Webster B. Harpman

[57] ABSTRACT

A pusher plate for a horizontally discharging semi-trailer is formed with a forwardly and downwardly extending support on the material engaging face thereof arranged to slidably engage the floor of the semi-trailer so as to hold the pusher plate in a vertical position in the semi-trailer body in which it is movably positioned.

9 Claims, 4 Drawing Figures

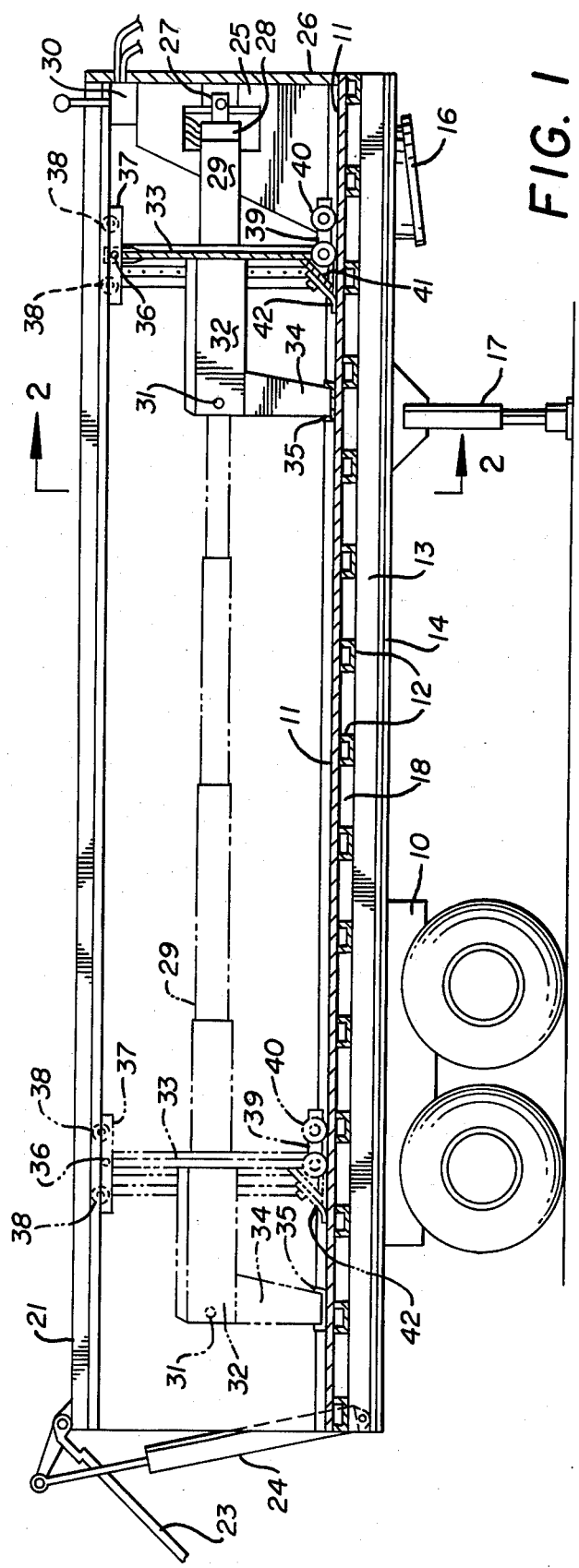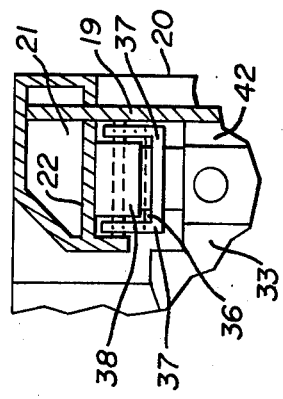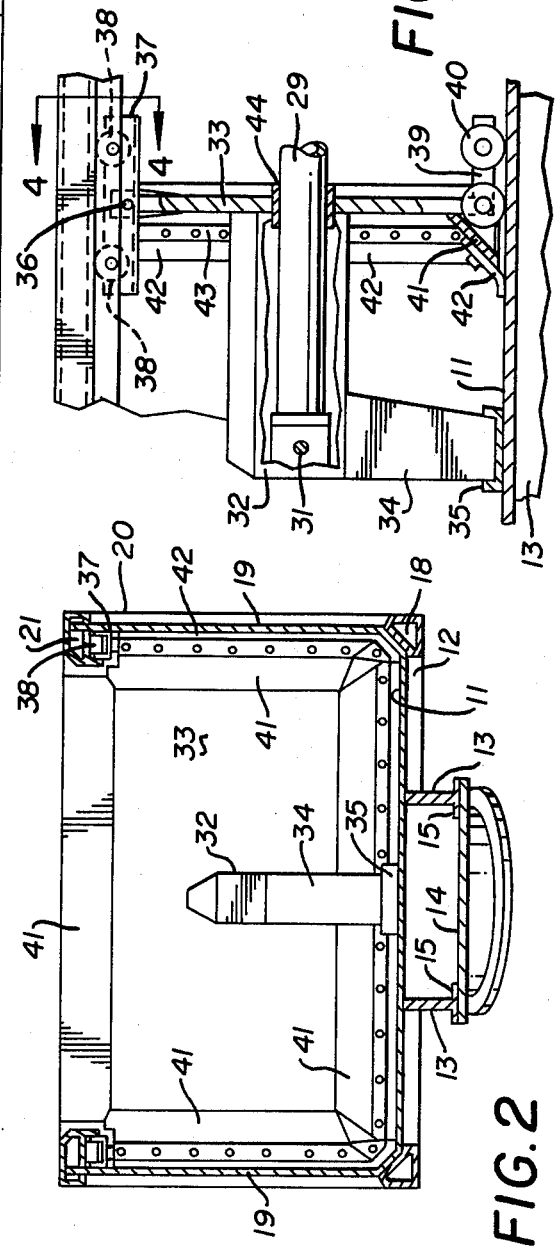

VERTICAL PUSHER PLATE FOR A HORIZONTALLY DISCHARGING SEMI-TRAILER

BACKGROUND OF THE INVENTION

1. Field of the Invention

This invention relates to pusher plates in horizontally discharging semi-trailers as used in the over-the-road hauling of bulk materials such as coal, limestone, blast furnace slag, concrete aggregates, block top paving materials and the like.

2. Description of the Prior Art

Prior semi-trailers of this type have comprised open top semi-trailer vehicles with floor and wall constructions designed to support the weight of the material therein and have been provided with hydraulic rams for moving a pusher plate longitudinally thereof. (See U.S. Pat. Nos. 3,815,764, 3,273,728, 3,175,708 and 2,856,086).

This invention relates to an improvement in the structure of the pusher plate in providing a support structure acting to prevent tilting of the pusher plate from a desired vertical position when expelling a load from the semi-trailer.

SUMMARY OF THE INVENTION

A pusher plate of novel configuration and construction includes a forwardly and downwardly extending support structure on the material engaging face of the pusher plate arranged to slidably engage the floor of the semi-trailer in which the pusher plate moves in expelling a load therefrom. The support structure resists the tendency of the pusher plate to tilt from a desired vertical position to an inclined positioned particularly when the load being pushed from the semi-trailer covers only part of the face of the pusher plate. Any tendency of the pusher plate to tilt is translated into a downward force by the support structure which is slidably engaging the floor of the semi-trailer in front of the pusher plate.

Maintaining the pusher plate in vertical position prevents it from climbing upwardly and out of its desired position in the semi-trailer body.

DESCRIPTION OF THE DRAWINGS

FIG. 1 is a vertical section of a horizontally discharging semi-trailer provided with the pusher plate of the present invention, broken lines indicating an alternate position of the pusher plate;

FIG. 2 is a vertical cross section on line 2—2 of FIG. 1;

FIG. 3 is an enlarged detailed cross sectional side elevation of a portion of the device seen in FIG. 1;

FIG. 4 is an enlarged vertical section on line 4-4 of FIG. 3.

DESCRIPTION OF THE PREFERRED EMBODIMENT

In the form chosen for illustration herein, the invention comprises an improved pusher plate in an over-the-road semi-trailer in which a ground engaging wheel, axle and spring suspension unit 10 is positioned under and attached to one end of a combination floor and frame in which a floor 11 is supported on a plurality of transversely positioned longitudinally spaced U-shaped channel members 12. A pair of transversely spaced longitudinally extending I-beams 13 are notched along their upper edges so as to register with the longitudinally spaced channel members 12 and the channel members 12 and the I-beams 13 are continuously welded to one another throughout their areas of contact.

A reinforcing plate 14 is secured to flanges 15 on the lower edges of the I-beam 13 to form a rigid box-like frame therewith that extends along the I-beams 13 and throughout their length. The wheel carrying assembly 10 is secured to the plate 14 and a fifth wheel 16 is attached thereto adjacent the opposite end of the semi-trailer. A pair of retractable supports 17 are pivotally secured to the plate 14 so that the semi-trailer can be supported thereby when the fifth wheel 16 thereof is not engaged on a tractor or the like as will be understood by those skilled in the art.

The longitudinal edges of the floor 11 are inclined upwardly and outwardly and directly supported by continuous engagement with longitudinally extending box frames 18, the innermost portions of which are joined to the opposite ends of the channel members 12. Side walls 19 extend upwardly and are reinforced by a plurality of longitudinally spaced vertically standing channels 20 which are continuously welded thereto along their meeting edges. The upper longitudinal edges of the side walls 19 and the upper ends of the channels 20 are attached as by welding to longitudinally extending box rails 21, the inner opposed edges of which are arranged at an angle and extend downwardly below a horizontally disposed bottom member 22.

As seen in FIG. 1 of the drawings, a tailgate 23 is pivoted to the upper outer corners of the box rails 21 and a hydraulic piston and cylinder assembly 24 is arranged to move the tailgate 23 from closed to open position. At the other end of the semi-trailer seen in FIG. 1 of the drawings, a pair of vertically standing support frames 25 are positioned on the floor 11 directly above the I-beams 13 and adjacent a front wall 26 of the semi-trailer body. The support frames 25 are securely attached to the floor 11 and carry a pair of brackets 27 which provide for the reception of a cylinder mounting 28 which in turn is part of a double acting multiple section telescopic hydraulic ram 29. Appropriate hydraulic fluid supply lines extend from the ram 29 to a control valve 30 which in turn is placed in communication with a source of fluid pressure as will be understood by those skilled in the art. The other end of the multiple section telescopic hydraulic ram 29 is engaged on a transverse pivot 31 in the forward end of a horizontal portion 32 of a forwardly and downwardly extending support attached to the material engaging face of a vertically standing pusher plate 33. A vertical portion 34 of the forwardly and downwardly extending support of the pusher plate 33 is provided with a plastic shoe 35 on its lowermost end which is slidably engaged on the floor 11 of the semi-trailer body.

By referring now to FIGS. 2, 3 and 4 of the drawings, it will be seen that the upper outer corners of the pusher plate 33 are provided with upwardly extending members with pivots 36 which in turn pivotally support tandem frames 37 which in turn carry a pair of horizontally spaced rollers 38, the uppermost portions of the tandem frames 37 and the rollers 38 being engaged in the recesses formed by the box rails 21 and their bottom members 22 respectively.

By again referring to FIGS. 1 and 3 of the drawings, it will be seen that the lower corners of the pusher plate 33 are provided with L-shaped rearwardly extending frames 39 which in turn are provided with secondary rollers 40 which in turn rest on the floor 11 of the semi-trailer body. It will also be seen that the edges of the pusher plate 33 are reinforced by angularly disposed outwardly extending flanges 41 and that they in turn are provided with plastic wiper strips 42 where they engage the side walls 19 and floor 11 of the semi-trailer body. The plastic wiping strips 42 are secured to the flanged edges of the pusher plate 33 by clamping strips 43.

By referring now to FIG. 3 of the drawings, it will be seen that the forward section of the hydraulic ram 29 extends through an opening 44 in the center of the pusher plate 33 and it will be apparent that when the ram 29 extends from the position shown in solid lines in FIG. 1 of the drawings to the position shown in broken lines, the pusher plate 33 is actually pulled toward the rear of the semi-trailer body, to the left as seen in FIG. 1 of the drawings, and that when the pusher plate 33 encounters material in the semi-trailer body to be moved outwardly thereof a greater proportion of the material is engaged against the central and lower sections of the pusher plate 33 than against its upper most portion with the resulting tendency of the pusher plate 33 to tilt from its normal vertical position to an inclined position where its uppermost portion will be inclined to the left as seen in FIGS. 1 and 3 of the drawings and where the tendency of the pusher plate will then be to slide upwardly over the material being pushed from the semi-trailer body.

In prior art devices this tendency of tilting and climbing has resulted in movement of the pusher plate upwardly and out of the body despite the attempts to restrain it therein by guide configurations and the like. The present invention relates primarily therefore to the forwardly and downwardly extending support structure formed of the horizontal portions 32 and vertical portions 34 as hereinbefore described which translate any tilting tendency and tilting forces exerted by the pusher plate 33 to downward forces which are transmitted to the floor 11 of the trailer body by the vertical portion 34 and its plastic shoe 35 sliding thereon. As a result of the arrangement the pusher plate maintains its desired vertical position at all times regardless of the disposition of the load being engaged thereby and it is therefore able to operate successfully under all load conditions.

An earlier form of the pusher plate seen herein may be seen in my co-pending application for patent Ser. No. 693,638, filed June 7, 1976 and the same semi-trailer body and its improved construction may be seen in my co-pending application Ser. No. 693,639, filed on the same day.

Although but one embodiment of the present invention has been illustrated and described, it will be apparent to those skilled in the art that various changes and modifications may be made therein without departing from the spirit of the invention and having thus described my invention what I claim is.

I claim:

1. A vertical pusher plate machanism for operation in a horizontally discharging semi-trailer having an elongated body with a floor and a discharge opening in one end, comprising:
    a vertically oriented pusher plate slidably mounted in the trailer body for movement toward and away from the discharge opening;
    a pusher plate moving means mounted to one side of said pusher plate on the trailer body, extending through said pusher plate and connected thereto on the other side of said pusher plate near the center of said pusher plate, said pusher plate moving means being oriented and connected to said pusher plate to apply horizontally directed force to said pusher plate near the center of said pusher plate;
    a pusher plate supporting means which includes a first elongate portion connected at one end thereof to said pusher plate other side near the center of said pusher plate to extend horizontally and outwardly from said pusher plate and a second elongate portion connected at one end thereof to the other end of said first elongate portion, said second elongate portion extending downwardly from said first elongate portion and having the other end thereof slidably contacting the trailer body floor at a location between said pusher plate and the discharge opening so that forces acting on said pusher plate tending to tilt same as said plate moves toward the trailer discharge opening are transmitted to the trailer body via said pusher plate supporting means.

2. The improvement in a vertical pusher plate for a horizontally discharging semi-trailer set forth in claim 1 and wherein the elongated body has a smooth floor and the support slidably engages the same.

3. The improvement in a vertical pusher plate for a horizontally discharging semi-trailer set forth in claim 1 and wherein the elongated body has a smooth floor and the support slidably engages the same and wherein a plastic shoe is positioned on said support in sliding arrangement with said floor.

4. The improvement in a vertical pusher plate for operation in a horizontally discharging semi-trailer set forth in claim 1 and wherein box rails are formed on the upper longitudinal edges of said elongated body and a roller assembly is positioned on each of the upper outer corners of said member with said rollers engaged in said box rails for guidance thereby.

5. The improvement in a vertical pusher plate for operation in a horizontally discharging semi-trailer set forth in claim 1 and wherein box rails are formed on the upper longitudinal edges of said elongated body and a roller assembly is positioned on each of the upper outer corners of said members with said rollers engaged in said box rails for guidance thereby and wherein secondary roller assemblies are mounted on the bottom of said member in supporting relation thereto with respect to said body.

6. The improvement in a vertical pusher plate for operation in a horizontally discharging semi-trailer set forth in claim 1 and wherein said means for moving the pusher plate toward and away from said discharge opening comprises a double acting multiple section telescopic hydraulic ram a portion of which is positioned through an opening in said pusher plate substantially centrally thereof and secured to said outwardly and downwardly extending support at a location in spaced relation to said pusher plate.

7. The improvement in a vertical pusher plate for a horizontally discharging semi-trailer set forth in claim 4 and wherein a tandem frame is pivoted to said upper outer corners of said member and said roller assembly consists of a pair of rollers journaled in said tandem frame.

8. The improvement in a vertical pusher plate for a horizontally discharging semi-trailer set forth in claim 7 and wherein said vertically standing member and said outwardly and downwardly extending support are integral and rigid.

9. The improvement in a vertical pusher plate for a horizontally discharging semi-trailer set forth in claim 4 and wherein said vertically standing member and said outwardly and downwardly extending support are integral and rigid.

* * * * *